United States Patent
Zhang et al.

(10) Patent No.: US 12,353,585 B2
(45) Date of Patent: Jul. 8, 2025

(54) DUAL WRITE AND DUAL READ ACCESS TO GRAPH DATABASES

(71) Applicant: PayPal, Inc., San Jose, CA (US)

(72) Inventors: Xia Zhang, Shanghai (CN); Pengshan Zhang, Shanghai (CN); Kun Wang, Shanghai (CN); Jiaxin Fang, Shanghai (CN); Jun Li, Shanghai (CN); Xin Wang, Shanghai (CN); Yangxing Liu, Shanghai (CN); Yu Zhang, Shanghai (CN); Changle Lian, Suzhou (CN); Ying Yue, Shanghai (CN); Xiaojun Luan, Shanghai (CN)

(73) Assignee: PayPal, Inc., San Jose, CA (US)

( * ) Notice: Subject to any disclaimer, the term of this patent is extended or adjusted under 35 U.S.C. 154(b) by 241 days.

(21) Appl. No.: 18/053,870

(22) Filed: Nov. 9, 2022

(65) Prior Publication Data
US 2024/0086563 A1    Mar. 14, 2024

(30) Foreign Application Priority Data

Sep. 13, 2022  (WO) ................ PCT/CN2022/118421

(51) Int. Cl.
*G06F 21/62*   (2013.01)
*G06F 16/2453*  (2019.01)

(52) U.S. Cl.
CPC .... *G06F 21/6227* (2013.01); *G06F 16/24535* (2019.01); *G06F 2221/2141* (2013.01)

(58) Field of Classification Search
CPC ........... G06F 21/6227; G06F 16/24535; G06F 2221/2141; G06F 16/289; G06F 16/24;
(Continued)

(56) References Cited

U.S. PATENT DOCUMENTS 9,646,262 B2    5/2017 Philipps et al.
10,102,086 B2*  10/2018 Cai ..................... G06F 16/278
(Continued)

FOREIGN PATENT DOCUMENTS

CN    101436192 A    5/2009
CN    104123374 A    10/2014
(Continued)

OTHER PUBLICATIONS

International Search Report and Written Opinion in PCT Appl. No. PCT/CN2022/118421 mailed Jan. 18, 2023, 9 pages.

*Primary Examiner* — Sargon N Nano
(74) *Attorney, Agent, or Firm* — Kowert, Hood, Munyon, 1Rankin & Goetzel, P.C.; Scott W. Pape; Dean M. Munyon

(57) ABSTRACT

A method for operating a graph database, including receiving, by a computer system, a query to a particular graph database, the query identifying a plurality of vertices of the particular graph database. The method further includes performing, by the computer system, hash operations on two or more of the plurality of vertices to generate respective hash values and dividing, using the respective hash values, the query into a plurality of sub-queries, each corresponding to a subset of the plurality of vertices. The method also includes sending, by the computer system, ones of the plurality of sub-queries to a plurality of database repositories for the particular graph database.

20 Claims, 8 Drawing Sheets

(58) Field of Classification Search
CPC .... G06F 16/245; G06F 16/2452; G06F 21/62; G06F 16/2453
USPC .......................................................... 726/7
See application file for complete search history.

(56) References Cited

U.S. PATENT DOCUMENTS

| | | | |
|---|---|---|---|
| 10,229,155 B2* | 3/2019 | Sharma | G06F 16/244 |
| 10,409,782 B2 | 9/2019 | Philipps et al. | |
| 10,437,843 B2* | 10/2019 | Nguyen | G06F 16/24542 |
| 10,445,321 B2* | 10/2019 | Song | G06F 16/9024 |
| 10,678,810 B2 | 6/2020 | Rehal | |
| 10,754,853 B2* | 8/2020 | Broecheler | G06F 16/2322 |
| 10,810,179 B2* | 10/2020 | Risvik | G06F 16/27 |
| 11,442,920 B2* | 9/2022 | Zang | G06F 16/9024 |
| 11,481,378 B1* | 10/2022 | Shackell | G06F 16/278 |
| 2007/0192474 A1* | 8/2007 | Decasper | H04L 67/306 709/223 |
| 2015/0134637 A1* | 5/2015 | Pall | G06F 16/9024 707/718 |
| 2015/0193636 A1* | 7/2015 | Snelling | G06F 21/6218 726/28 |
| 2016/0063134 A1* | 3/2016 | Yu | G06F 16/9024 707/746 |
| 2016/0179979 A1* | 6/2016 | Aasman | G06F 16/24532 707/603 |
| 2017/0091246 A1* | 3/2017 | Risvik | G06F 16/2471 |
| 2018/0351835 A1* | 12/2018 | Williams | H04L 67/535 |
| 2020/0226156 A1 | 7/2020 | Rehal | |
| 2021/0034625 A1* | 2/2021 | Shah | G06F 16/248 |
| 2021/0149873 A1* | 5/2021 | Sinha | G06F 16/2365 |
| 2022/0335068 A1* | 10/2022 | Yue | G06F 16/285 |
| 2023/0281687 A1* | 9/2023 | Bhardwaj | G06Q 30/0609 705/26.35 |

FOREIGN PATENT DOCUMENTS

| | | |
|---|---|---|
| CN | 105210058 A | 12/2015 |
| CN | 111367885 A | 7/2020 |
| WO | 2014169265 A1 | 10/2014 |
| WO | 2016018947 A1 | 2/2016 |

* cited by examiner

400

*Receiving, by a computer system, a query to a graph database, the query identifying a plurality of vertices of the graph database.*
*410*

*Performing, by the computer system, hash operations on two or more of the plurality of vertices to generate respective hash values.*
*420*

*Dividing, by the computer system using the respective hash values, the query into a plurality of sub-queries, each corresponding to a subset of the plurality of vertices.*
*430*

*Sending, by the computer system, ones of the plurality of sub-queries to a plurality of database repositories for the graph database.*
*440*

FIG. 4

DUAL WRITE AND DUAL READ ACCESS TO GRAPH DATABASES

PRIORITY CLAIM

The present application claims priority to PCT Appl. No. PCT/CN2022/118421, filed Sep. 13, 2022, which is incorporated by reference herein in its entirety.

BACKGROUND

Technical Field

Embodiments described herein are related to the field of graph database management, and more particularly to techniques for storing data to and retrieving data from a graph database.

Description of the Related Art

A graph database is a type of database that uses graph structures (e.g., vertices and edges) to store database items to track relationships to other database items. A vertex may represent a given item and then one or more edges may be determined to indicate links to other vertices with a given similarity. For example, a particular graph database may store user information for a plurality of users in respective vertices. One or more types of edges may be used to track respective similarities between vertices. One type of edge may be a type of web browser used. A respective edge may be identified between two vertices that have used a same web browser. Other edge types may include internet service providers (ISPs), types of computer hardware used, or essentially any piece of information that is available within a given vertex.

Graph databases may be useful for gathering data associated with relationships between vertices. For example, queries to identify all users who use a same ISP may be easily processed using a graph database that includes ISPs as an edge between vertices representing users. Graph databases may also be useful to process more complex queries. For example, a query could be generated to identify users utilizing a same ISP as well as similar computer hardware.

Graph databases may be managed by an entity that allows online subscribers to access some or all of the information stored in the graph database. Accordingly, such a graph database may have periods of high demand when many subscribers are generating queries concurrently. In addition, information stored in the graph database may be gathered from online usage by subscribers and/or other users of the entity's services, resulting in a large amount of data being captured every day.

BRIEF DESCRIPTION OF THE DRAWINGS

The following detailed description makes reference to the accompanying drawings, which are now briefly described.

FIG. 4 illustrates a flow diagram of an embodiment of a method for processing a query from a user to a graph data server.

DETAILED DESCRIPTION OF EMBODIMENTS

Figure 1:
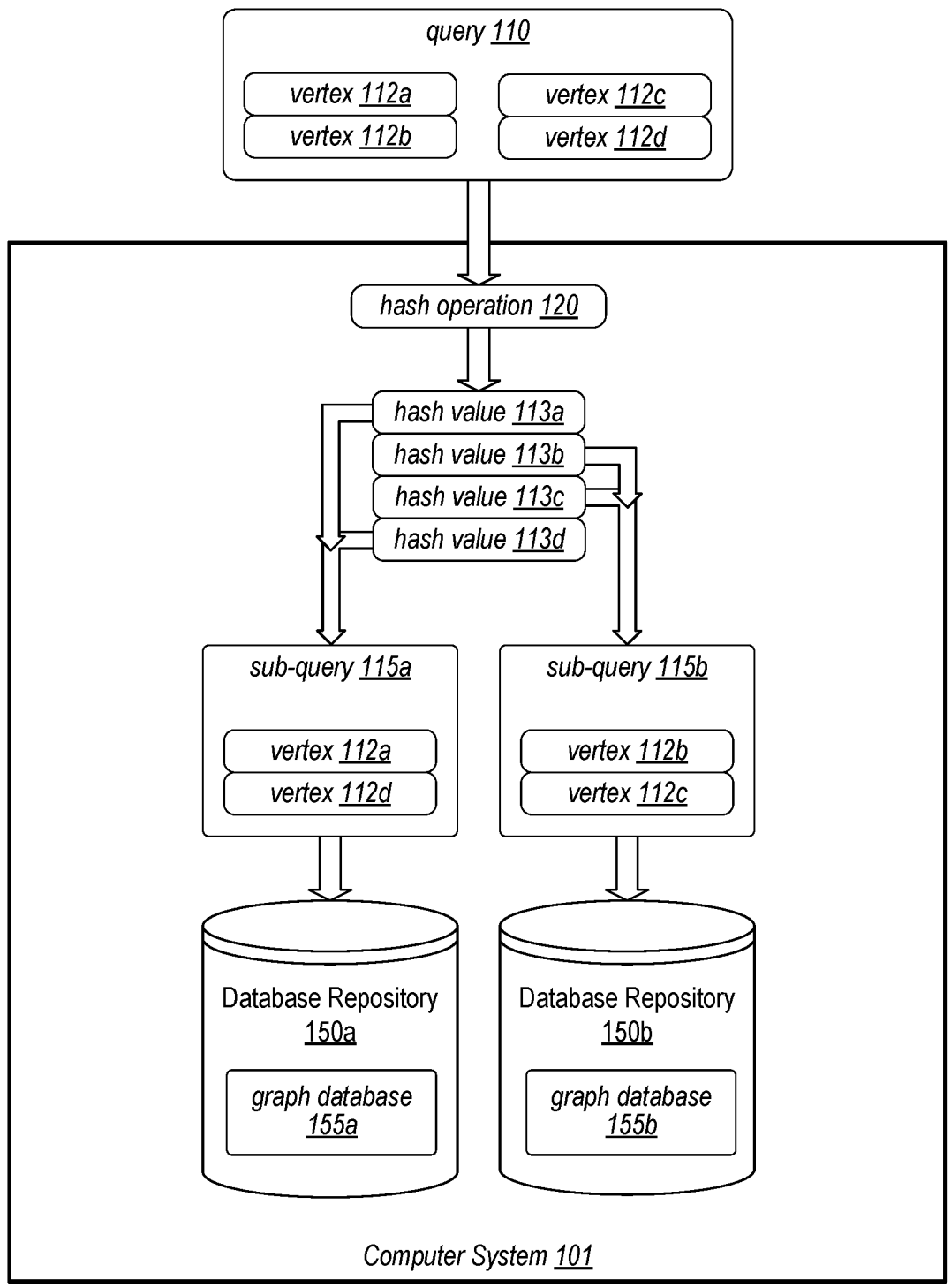
FIG. 1 illustrates a block diagram of an embodiment of a graph data server processing a query.

Graph databases may be used to gather and track a wide variety of information as respective vertices linked by a variety of related edges. For example, an online service may have a plurality of clients who perform electronic exchanges among each other and/or other entities. The online service may track individual clients as vertices in a graph database with the various electronic exchanges generating edges between pairs of vertices. Such exchanges may be performed at any time of any day. Accordingly, a process for capturing and storing new records corresponding to performed exchanges may be active continuously.

In some cases, the online service may provide access to the graph database to a plurality of users. The plurality of users may include users internal to the online service, clients of the service, subscribers to the database, and the like. The online service may divide the users into two or more groups, each group being assigned a particular set of restrictions and/or permissions. To protect certain database information, one or more groups may be restricted from accessing a particular type of information, e.g., particular types of vertices or edges, or particular pieces of information included within a given vertex or edge. One technique to protect such data may include maintaining separate copies of the graph database, allowing one set of user groups to access a respective copy of the database. In such cases, a copy for user groups with restrictions may exclude the restricted information. In other cases, a concern of the online service may be that a user of a restricted group may attempt to corrupt information in the graph database, e.g., as part of fraudulent activity. In these cases, the various copies of the graph database may be identical, but separate to avoid corruption of the information for all groups.

Maintaining multiple copies of the graph database while keeping vertices and edges in the multiple copies up to date with recent client activity may present a challenge. In addition, meeting particular levels of a guaranteed quality of service may be challenging when a high number of queries are generated. Accordingly, the present inventors propose techniques for operating a graph database that may reduce an amount of time for performing queries and may decrease an amount of time for updating records across multiple copies of the graph database repositories.

A proposed technique includes a computer system receiving a query to a particular graph database that is stored in a plurality of database repositories. The query identifies a plurality of vertices of the particular graph database. The computer system may perform hash operations on two or more of the plurality of vertices to generate respective hash values. The computer system may then use the respective hash values to divide the query into a plurality of sub-queries, each of these sub-queries corresponding to a subset of the plurality of vertices. Ones of the plurality of sub-queries may then be sent, by the computer system, to the plurality of database repositories storing one or more copies of the particular graph database.

Another proposed technique includes a computer system storing a duplicate of the disclosed particular graph database into a different pluralities of database repositories. For example, one graph database repository may be accessible by a first group of users categorized as risk, while a duplicate of the graph database is accessible by a second group of users categorized as non-risk. This duplicate graph database repository may not be accessible by the first group. To store a new record in both the particular and duplicate graph database repositories concurrently, the computer system may use respective data storage engines for the particular and duplicate graph databases. The computer system may then validate storage of the new record to the particular and duplicate graph databases by reading respective copies of the new record from the particular and duplicate graph databases, and comparing the respective copies to a copy of the new record held in the computer system.

Such graph database operation techniques may reduce delays between reception of a query to sending a response, thereby increasing a quality of service (QoS) related to processing queries. In addition, these techniques may increase an accuracy of information stored within multiple copies of a graph database repository by concurrently updating the multiple copies.

A block diagram for an embodiment of a graph data server is illustrated in FIG. 1. As shown, graph data server 100 includes computer system 101 that further includes database repositories 150a and 150b (collectively 150). Computer system 101, in various embodiments, may be implemented, for example, as a single computer system, a plurality of computer systems in a data center, as a plurality of computer systems in a plurality of data centers, and other such embodiments. In some embodiments, server computer system 101 may be implemented as one or more virtual computer systems hosted by one or more server computer systems. Computer system 101 receives query 110, e.g., via a connected computer network such as the internet, which is then divided into sub-queries 115a and 115b (collectively 115).

As illustrated computer system 101 is configured to maintain graph database 155 in database repositories 150. In various embodiments, graph database 155a and graph database 155b may be identical copies of graph database 155, or may be respective portions of graph database 155. Graph database 155 may capture any suitable information that may be stored as a plurality of vertices, each vertex having one or more connections (e.g., edges) to other vertices. For example, graph database 155 may track users of an online service, each vertex 112 representing a respective user. Edges are determined between ones of the vertices 112 based on information associated with respective ones of vertices 112. A given edge may correspond to pieces of data associated with the user, such as addresses, interests, hobbies, and the like. Other edges may associate particular actions taken by users. For example, if the online service facilitates electronic exchanges between users, then information regarding the exchanges may be used to determine edges between vertices 112. If, e.g., a user represented by vertex 112a performed an electronic exchange with a user represented by vertex 112c, then this exchange may result in an edge between vertex 112a and vertex 112c. Details of the exchange, such as whether the exchange was successful or resulted in a complaint may form additional edges between vertex 112a and vertex 112c.

Computer system 101 is further configured to receive query 110 to graph database 155, query 110 identifying a plurality of vertices 112 (shown as vertex 112a through vertex 112d) of graph database 155. For example, a processor circuit of computer system 101 may execute instructions that are included in a memory circuit that, when executed by the processor circuit, cause computer system 101 to perform operations such as receiving and processing queries of graph database 155. To decrease an amount of time to process query 110, computer system 101 is configured to divide query 110 into sub-queries 115a and 115b.

To divide query 110, computer system 101 is configured to generate respective hash values 113a-113d (collectively 113) for a subset of vertices 112. It is noted that, in some embodiments, the subset may include all vertices 112. As shown, four hash values 113 are generated, a respective one hash value 113 for each of vertices 112. Generating hash values 113 may include performing hash operation 120 on one or more values included in each vertex 112. For example, each vertex 112 may include a user identification (ID), user name, address, contact information and the like. Hash operation 120 may be used to generate hash value 113a using a user ID value included in vertex 112a. Similarly, hash values 113b-113d may represent hash codes generated by hash operation 120 on user IDs from each of vertices 112b-112d, respectively. As a different example, hash values 113 may be generated by performing hash operation 120 on information about electronic exchanges associated with ones of vertices 112. Such information may include exchange types (e.g., non-fungible tokens, data files, media files), times and dates of an exchange, parties involved in the exchange, and so forth. In other embodiments, hash operation 120 may be performed on any suitable value stored in ones of vertices 112.

Computer system 101 is further configured, as illustrated, to use the respective hash values 113 to distribute vertices 112 among sub-queries 115a and 115b. Any suitable technique for distributing hash values 113 between sub-queries 115a and 115b. For example, hash values 113 that are odd values may be mapped to sub-query 115a while hash values 113 that are even values are mapped to sub-query 115b. In other embodiments, a threshold value may be used for the distribution. Hash values 113 less than the threshold are mapped to sub-query 115a while hash values 113 greater than or equal to the threshold are mapped to sub-query 115b. Such embodiments, multiple thresholds may be used to map hash values 113 into more than two different sub-queries. Vertices 112 are placed into the sub-query 115 of its respective hash value 113. Hash operation 120 may be operable to evenly distribute resulting hash values across the mapped sub-queries, such that sub-queries 115a and 115b, on average, will each include a similar number of vertices. As shown, vertices 112a and 112d are mapped to sub-query 115a and vertices 112b and 112c are mapped to sub-query 115b.

As illustrated, ones of sub-queries 115 are sent to respective repositories of database repositories 150a and 150b. As described above, each of database repositories 150 may include respective duplicates of graph database 155, or may include respective portions. As shown, computer system 101 is configured to send sub-query 115a to database repository 150a to perform sub-query 115a on graph database 155a. Similarly, sub-query 115b is sent to database repository 150b to perform sub-query 115b on graph database 155b. The respective sub-query results may then be returned to computer system 101 from each of database repositories 150 where the respective results may then be combined into a response to query 110. By dividing query 110 into a plurality of sub-queries 115 and sending the sub-queries 115 to different database repositories 150, a processing time for query 110 may be reduced, and the workload introduced by query 110 may be distributed across the plurality of database repositories 150. Reduction of the response time may, in some cases, enable computer system 101 to meet a particular quality of service (QoS) target for performing queries. Such QoS targets may be included in client contracts, and therefore meeting these targets may avoid client dissatisfaction.

It is noted that graph data server 100, as illustrated in FIG. 1, is merely an example. FIG. 1 has been simplified to highlight features relevant to this disclosure. In other embodiments, additional elements that are not shown may be included, and/or different numbers of the illustrated elements may be included. For example, although two database repositories are shown for clarity, any suitable number of repositories may be included. Although shown as being included within computer system 101, one or both of database repositories 150 may be implemented external to computer system 101.

The embodiment illustrated in FIG. 1 describes sending the sub-queries to respective database repositories. In some cases, a given repository may be unavailable. Unavailable repositories may be managed using a variety of techniques. Two examples of managing an unavailable repository are shown in FIG. 2.

Figure 2:
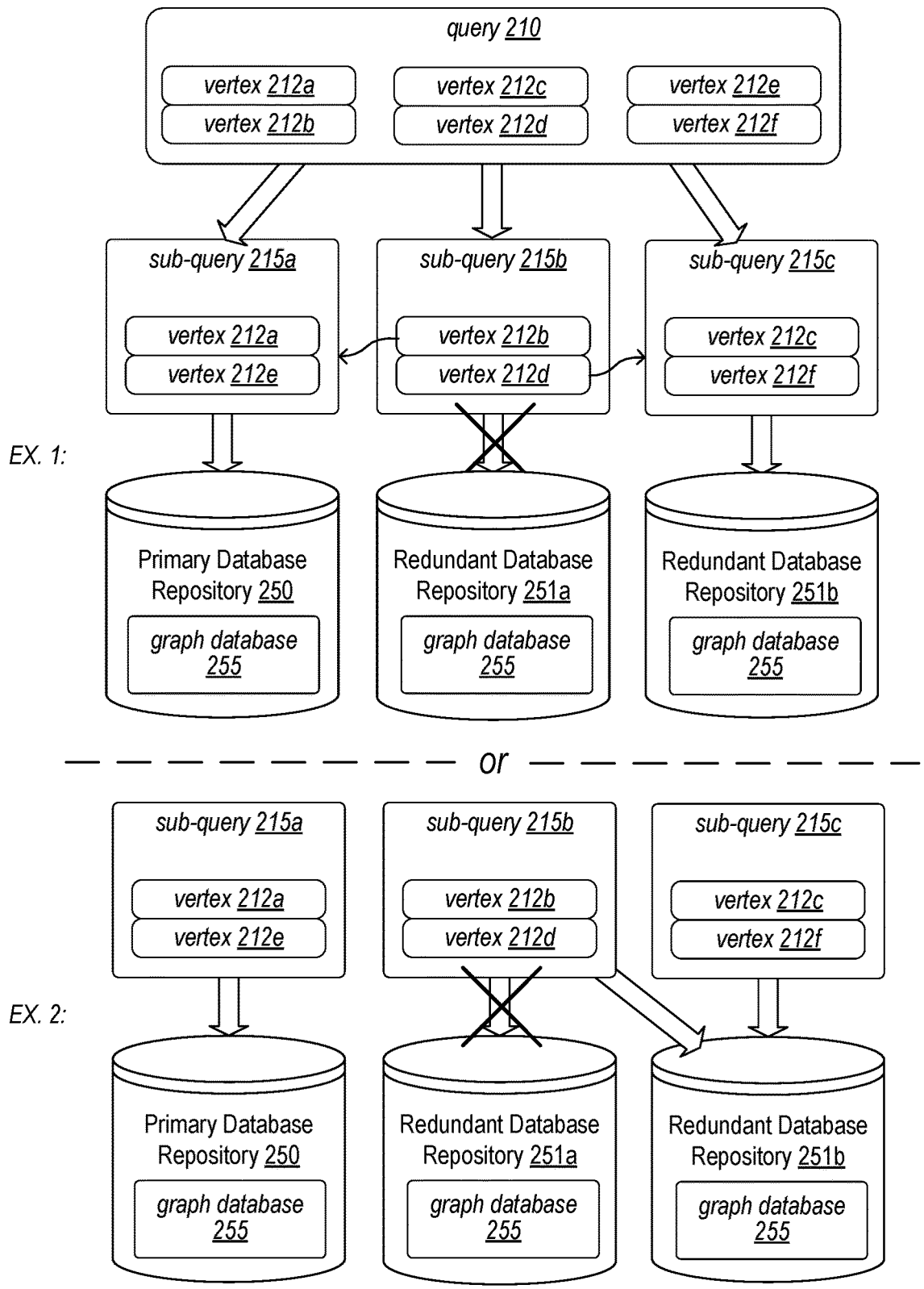
FIG. 2 shows two block diagrams of an embodiment of a graph data server with redundant database repositories.

Moving to FIG. 2, two block diagrams of an embodiment of a graph data server that includes redundant database repositories, each including respective copies of a graph database, are shown. As illustrated, graph data server 200 includes primary database repository 250, and redundant database repositories 251a and 251b. Graph data server receives query 210 and generates sub-queries 215a-215c (collectively 215).

Graph data server 200 includes a plurality of repositories, among which graph database 255 is stored. In some embodiments, portions of graph database 255 may be stored across the plurality of repositories such that only some, or in some cases none, of the individual repositories holds a complete copy of graph database 255. As illustrated, however, primary database repository 250 includes a primary copy of graph database 255 and each of redundant database repositories 251a and 251b hold respective redundant copies of graph database 255. Accordingly, a query, such as query 210, can be performed using any one of the copies of graph database 255. It is noted that, as new records are added and/or existing records are modified, the respective copies of graph database 255 may have temporary differences as the record changes propagate to all copies.

As described above, a computer system (e.g., computer system 101 of FIG. 1) in graph data server 200 receives a query and divides the query into a plurality of sub-queries. In FIG. 2, query 210 (including six vertices 212a-212f) is received and divided into sub-queries 215a-215c. Graph data server 200 sends ones of the plurality of sub-queries 215 to respective ones of primary database repository 250 and redundant database repositories 251. Sub-query 215a includes vertices 212a and 212e and is sent to primary database repository 250. Sub-query 215b includes vertices 212b and 212d and is sent to redundant database repository 251a, while sub-query 215c includes vertices 212c and 212f and is sent to redundant database repository 251b.

For a variety of circumstances, one or more of the database repositories may be unable to process a received query. As shown in examples (EX) 1 and 2 of FIG. 2, redundant database repository 251a is unavailable. For example, redundant database repository 251a may be taken offline for maintenance or may be down due to a hardware or software issue. In some embodiments, redundant database repository 251a may currently be experiencing a high number of queries and/or other tasks that reduce processing bandwidth, thereby delaying a response to sub-query 215b. Graph data server 200 may be operable to manage such cases of repository unavailability using a variety of techniques.

In example 1, graph data server 200 receives an indication that redundant database repository 251a is unavailable and, therefore, cannot perform sub-query 215b in a timely manner that satisfies a particular QoS target. In response to the indication, graph data server 200 distributes vertices 212b and 212d included in sub-query 215b into the remaining sub-queries 215a and 215c. As shown, vertex 212b is added to sub-query 215a and vertex 212d is added to sub-query 215c. In some embodiments, the reassignment may be based on hash values previously generated to assign the two vertices to sub-query 215b. In other embodiments, new hash values may be generated and then used for the reassignment. In some embodiments, new hash values may be generated for all six vertices 212 to increase a likelihood that the six vertices are distributed equally among the remaining sub-queries 215.

In example 2, graph data server 200 receives the indication that redundant database repository 251a is unavailable. In response to the indication, graph data server 200 reassigns sub-query 215b intended for the unavailable redundant database repository 251b to an available one of the remaining database repositories. As shown in example 2, sub-query 215b is reassigned to redundant database repository 251b. In some embodiments, redundant database repository 251b may be selected based on having more available bandwidth that primary database repository 250. For example, in response to sending each of sub-queries 215, the respective database repositories may reply with an indication of current available bandwidth, an indication of estimated response time, and/or other information that enables graph data server to determine which database repositories are capable of performing the respective sub-queries and which sub-queries should be reassigned.

It is noted that the embodiment of FIG. 2 merely illustrates examples that demonstrate the disclosed concepts. In other embodiments, a different combination of blocks may be included. For example, in the illustrated embodiment, three database repositories are shown. In other embodiments, any suitable number of database repositories may be included in the graph data server. Although the database repositories are shown as being included within graph data server 200, in other embodiments, one or more of the repositories may be external to graph data server 200. For example, database repositories may include server storage leased from a third party.

Figure 3:
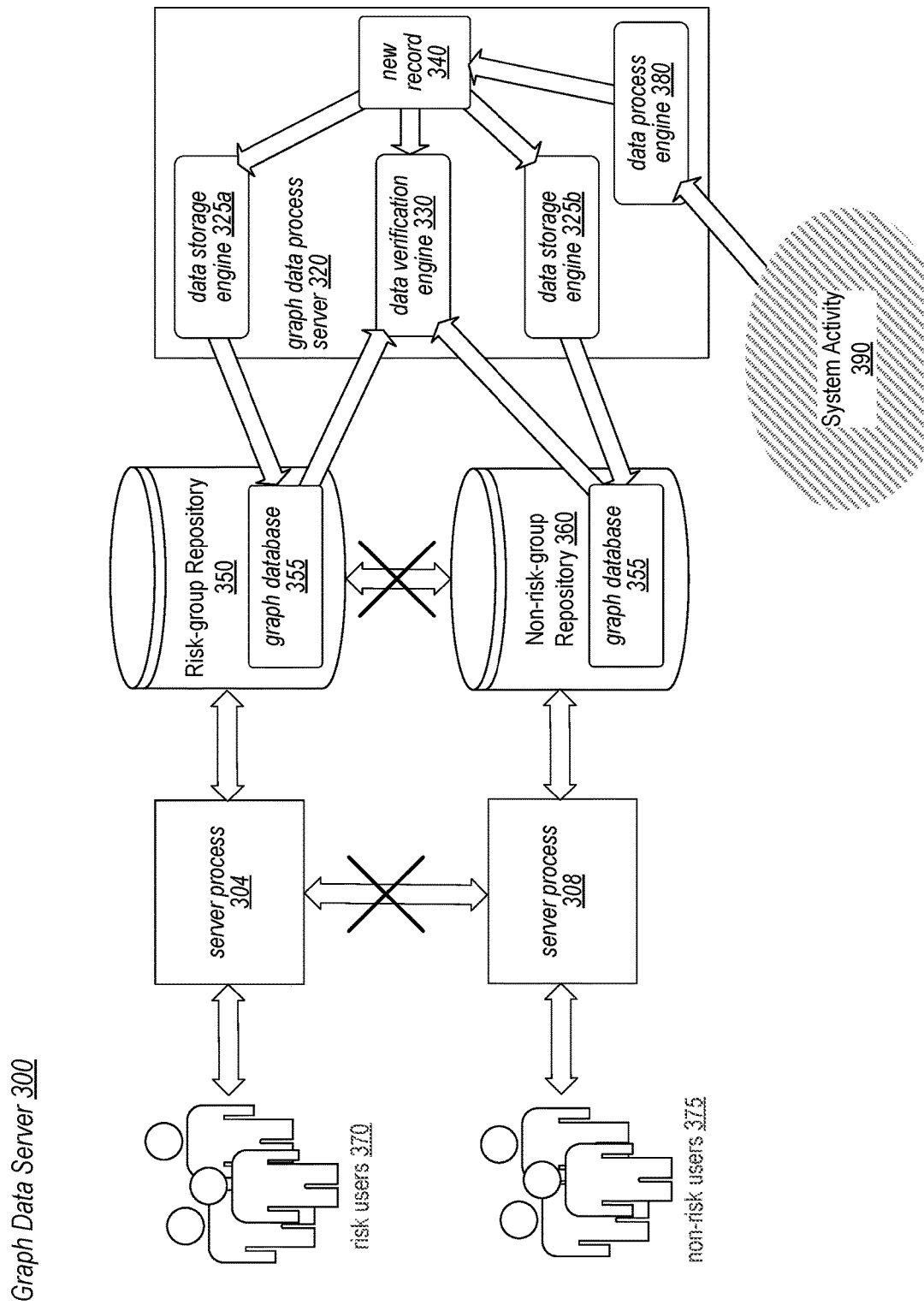
FIG. 3 depicts a block diagram of an embodiment of a graph data server that maintains two versions of a database repository for respective groups of users.

FIGS. 1 and 2 illustrate techniques for processing a query to a graph database. The graph database is described as being maintained across a plurality of database repositories, each usable to perform, at least a portion of, a received query. Other schemes for maintaining a graph database are contemplated. FIG. 3 provides an example of another technique for managing a graph data server.

Turning to FIG. 3, a block diagram of an embodiment of a system that maintains separate copies of a graph database for different groups of users is depicted. As shown, graph data server 300 includes risk-group repository 350, non-risk-group repository 360, and graph data process server 320. Graph data server 300 uses server process 304 to service risk users 370 and server process 308 to service non-risk users 375. It is noted that risk and non-risk user groups are used as a non-limiting example for maintaining separate copies of a graph database. Other examples for maintaining separate copies are contemplated. For example, separate copies may be used for serving different geographic regions, different political/national boundaries, different client service agreements, and the like.

As shown, graph data server 300 includes risk-group repository 350 that holds a copy of graph database 355. Risk-group repository 350 may, in some embodiments, include a plurality of database repositories, such as primary database repository 250 and redundant database repositories 251 shown in FIG. 2. In addition to the copy of graph database 355 stored in risk-group repository 350, graph data server 300 stores a duplicate of graph database 355 into non-risk-group repository 360. In a similar manner as risk-group repository 350, non-risk-group repository 360 may include a different plurality of database repositories. The copy of graph database 355 in risk-group repository 350 is accessible by a first group of users, risk users 370. The copy of graph database 355 in non-risk-group repository 360 is accessible by a second group of users, non-risk users 375, and is not accessible by risk users 370.

Graph data server 300 may support a wide variety of users who subscribe to services provided by graph data server 300. Graph data server 300, as shown, categorizes various users into one of two groups, either "risk" users or "non-risk" users. Categorization may be based on various attributes of respective users, including attributes that may provide indications whether a particular user is associated with a threshold level of risk. Risk users 370 may include users that have been associated with prior activities that were questionable, such as potential fraudulent behavior, activities that resulted in a complaint or claim being filed, and/or activities associated with hacking. In such cases, the known behavior may not be adequate to ban the user or terminate their subscription. In some cases, users associated with other users that are involved in such questionable behavior may be included in the risk users 370. New subscribers that do not have a history that can be tracked by graph data server 300 may also be included in risk users 370.

Users that do not satisfy the threshold level of risk may be placed in non-risk users 375. Non-risk users 375 may include users that have subscribed to services of graph data server 300 for a particular amount of time without generating any questionable behavior. In some cases, non-risk users may include users associated with entities that are trusted. For example, users employed by a corporation that has a long, trusted relationship with graph data server 300 may be placed into non-risk users 375, even if a particular user does not have personal history with graph data server 300.

Determination of the appropriate user group for a given user may be completed by a computer system within graph data server 300. For example, new users without available activity history may be placed into the risk users 370 by default. Processes running in graph data server 300 may monitor some or all activity associated with accounts assigned to risk users 370. A determination may then be made whether any of the monitored activity is associated with undesired behavior (e.g., matching known fraudulent patterns, performing electronic transfers with accounts that have been tagged for fraudulent activities, activity that disrupts performance of graph data server 300 or other services associated with graph data server 300, and the like). If, after a particular amount of time and/or amount of activity, a new user account is determined to exhibit few or no undesired behaviors, then the new user account may be reassigned to non-risk users 375.

Similarly, account activity of non-risk users 375 may also be monitored by one or more processes operating within graph data server 300. If, after a particular amount of time and/or amount of activity, a particular non-risk user account is determined to exhibit an amount of undesired behaviors that exceeds a threshold limit, then the particular non-risk user account may be reassigned to risk users 370.

Division of respective graph database 355 into risk-group repository 350 and non-risk-group repository 360 may provide increased security for non-risk users 375, by independently managing access to the respective repositories. As illustrated, graph data server 300 utilizes a different process to interface with risk and non-risk users. For example, graph data server 300 receives a first query from a user of risk users 370 using server process 304 running on a computer system (e.g., computer system 101 of FIG. 1). Graph data server 300 may further receive a second query from a user of non-risk users 375 using server process 308 running on computer system 101. Server processes 304 and 308 may perform the respective received first and second queries using a techniques such as described above in regards to FIGS. 1 and 2. Server process 304 utilizes risk-group repository 350 to perform the first query while server process 308 utilizes non-risk-group repository 360 to perform the second query.

As shown, server processes 304 and 308 are isolated from one another. During processing of the first and second queries, as well as at other times, server process 304 does not communicate with server process 308, and vice versa. Accordingly, if a user in risk users 370 engages in undesired activity (e.g., gains unauthorized access to server process 304) this user cannot interfere with or gain access to server process 308 or to non-risk-group repository 360. Accordingly, non-risk users 375 may have access to non-risk-group repository 360 with little to no threat of compromise from risk users 370.

To provide the independent services to risk users 370 and non-risk users 375, separate copies of graph database 355 are maintained in each of risk-group repository 350 and non-risk-group repository 360. Maintaining separate repositories, however, may introduce challenges for keeping both copies of graph database 355 up-to-date with equivalent information. To address such challenges, graph data server 300 utilizes graph data process server 320 stores the duplicates of graph database 355 by sending, using respective data storage engines 325a and 325b for risk-group repository 350 and non-risk-group repository 360, a new record (e.g., new record 340) to the respective copies of graph database 355 in risk-group repository 350 and non-risk-group repository 360 concurrently.

Graph data process server 320 includes data process engine 380 that may monitor system activity 390. System activity 390 may include any suitable types of activity associated with operation of graph data server 300, or a different system associated with graph data server 300. In some embodiments, graph data server 300 may be a part of an online entity that provides a plurality of services to users. For example, an online entity may provide a variety of services related to executing electronic exchanges between users. System activity, in such an embodiment, may include users logging into their accounts, identifying other users with which to execute an electronic exchange, and executing the exchange. Data process engine 380 may generate new records that correspond to each activity, and or respective new records for individual steps of a given activity. Executing an electronic exchange may include verifying identities of each party included in the exchange, performing risk assessments of each identified party, validating electronic items to be exchanged, and enabling transfer of ownership of each item. New records may be generated for each party in each step. New record 340 may correspond to one of these new records.

After new record 340 has been created by data process engine 380, graph data process server 320 sends a copy of new record 340 to each of data storage engines 325a and 325b. Acting independently of one another, data storage engines 325a and 325b send their corresponding copies of new record 340 to risk-group repository 350 and non-risk-group repository 360, respectively. While the storage of the copies of new record 340 to the respective repositories may not begin and end at exactly the same times, the concurrent operation of data storage engines 325a and 325b may reduce an amount of time during which the respective copies of graph database 355 in risk-group repository 350 and non-risk-group repository 360 differ.

After data storage engines 325a and 325b complete their respective storage operations, graph data process server, as shown, validates storage of new record 340 to risk-group repository 350 and non-risk-group repository 360 using data verification engine 330. Data verification engine 330 reads respective copies of new record 340 from risk-group repository 350 and non-risk-group repository 360. Data verification engine 330 may then compare each of the respective read copies of new record 340 to a copy of new record 340 held graph data process server 320 (e.g., in memory circuits of computer system 101). By reading the respective copies and comparing the multiple read copies to an original copy held in computer memory, data verification engine 330 may validate that each repository has a successfully stored copy of new record 340 as well as validating that the same information is stored in the respective copies of graph database 355 in each of risk-group repository 350 and non-risk-group repository 360.

It is noted that the system shown in FIG. 3 is merely an example to demonstrate the disclosed concepts. Some components have not been illustrated to increase clarity of the figure. For example, graph data server 300 may include a plurality of computer systems to implement the various processes and engines described. In some embodiments, e.g., server process 304 may be implement on one or more computer systems that are different from one or more computer systems used to implement server process 308. In other embodiments, server processes 304 and 308 may be performed on a same or overlapping set of computer systems.

As disclosed above, risk and non-risk user groups are used as a non-limiting example for the maintenance of two or more separate copies of a graph database in respective repositories. In other embodiments, any suitable set of requirements may be advantageously serviced by maintaining separate database repositories. For example, geopolitical boundaries may require a separation of database repositories. A particular country may implement standards for accessing particular types of information being held in the database. By maintaining a plurality of repositories with respective server processes to perform queries in the different repositories, the server processes may be implemented to meet a local countries standards. In such an embodiment, new user accounts are assigned to a respective group of users based on a country of origin from which the account is setup, or in some cases a country in which a given user is currently determined to be located.

Concurrently, a single graph data process server (or a plurality of graph data process servers in communication with one another) may be capable of maintaining an acceptable level of synchronicity between the plurality of repositories. For example, respective data process engines may be running to gather system activity from a plurality of different countries, each data process engine may be operable to conform to a local country's standards for data gathering. The gathered data may then be collected in a centralized graph data process server in which one or more new records may be created based on the collected activity. The new records may then be distributed, concurrently, to the various regional repositories using, for example, a respective data storage engine for each repository. These respective data storage engines may operate from the centralized location of the graph data process server, from computer systems based across multiple regions, or from a combination thereof.

As another example embodiment, separate graph database repositories may be maintained to support different client service agreements. For example, new clients may be presented with options for subscribing to basic, intermediate, or advanced levels of service, each offering a particular set of features. In addition, each level of service may have a respective quality of service agreement that includes a corresponding guaranteed maximum delay for receiving responses to performed queries. In such an embodiment, a new user is assigned to the user group to which they subscribed. By maintaining a separate repository for each level of service, each repository may be equipped and configured to support the respective features and query response times that correspond to the respective level of service. Accordingly, a basic service may be provided in which features and query response times are limited by a current bandwidth of the respective repository, despite a current number of basic level subscribers increasing. An advanced service may, however, limit a number of subscriptions such that the quality of service is not at risk of falling below the guaranteed level even if all advanced subscribers use the system simultaneously. In such an embodiment, adding new users to the advanced level may result in adding or upgrading equipment to the advanced level repository to ensure the guaranteed quality of service.

As described for the geopolitical example, a centralized graph data process server may collect system activity and concurrently distribute newly created records across the respective repositories to maintain an acceptable level of consistency across various copies of the graph database. Keeping the graph databases consistent across the plurality of repositories may reduce a risk of two queries submitted simultaneously from users of two different subscription levels from receiving different results.

FIGS. 1-3 have described aspects of the disclosed techniques for operating a graph data server. A variety of methods may be employed to perform the operations of a graph data server. Several such methods for operating a graph data server are described in FIGS. 4-7.

Turning now to FIG. 4, a flow diagram for an embodiment of a method for generating a smart protocol for execution on a blockchain platform is shown. Method 400 may be performed by a computer system in a graph data server, such as computer system 101 in graph data server 100 of FIG. 1. For example, computer system 101 may include (or have access to) a non-transient, computer-readable medium having program instructions stored thereon that are executable by computer system 101 to cause the operations described with reference to FIG. 4. Method 400 is described below using graph data server 100 of FIG. 1 as an example. References to elements in FIG. 1 are included as non-limiting examples.

Method 400 begins in block 410 by receiving, by a computer system, a query to a particular graph database, the query identifying a plurality of vertices of the particular graph database. For example, computer system 101 receives query 110 which includes four vertices, vertex 112a to vertex 112d. Query 110 may be received from an authorized user of graph data server 100. In various embodiments, query 110 may include a request to identify any or all edges between any two of the included vertices 112, to identify edges to other vertices common to any two or more of vertices 112, or other similar requests. In some embodiments, graph data server 100 may be a part of a larger online service, and graph database 155 may include a collection of information associated with users and user activity from the operation of the larger online service.

At 420, method 400 continues by performing, by the computer system, hash operations on two or more of the plurality of vertices to generate respective hash values. In the example of FIG. 1, hash operation 120 is performed on two or more of vertices 112 of query 110. As shown, four hash values 113 are generated, e.g., one for each of vertices 112. Hash operation 120 may use any suitable type of hashing algorithm that produces a balanced distribution of hash value outputs from vertices inputs.

Method 400 continues at 430 by dividing, by the computer system using the respective hash values, the query into a plurality of sub-queries, each corresponding to a subset of the plurality of vertices. As illustrated in FIG. 1, computer system 101 uses hash values 113 to distribute vertices 112a and 112d into sub-query 115a and vertices 112b and 112c into sub-query 115b. In some embodiments, number of sub-queries 115 may be determined by hash values 113. For example, possible values for hash values 113 may range between 1 and 100. Subranges may be mapped to particular sub-queries, e.g., hash values of 1-25 map to sub-query 115a, hash values of 26-50 map to sub-query 115b, hash values of 50-57 map to sub-query 115c (not shown), and hash values of 76-100 map to sub-query 115d (not shown). Accordingly, hash values 113a and 113d may fall in the 1-25 range while hash values 113b and 113c fall in the 26-50 range. In other embodiments, a number of available database repositories 150 may determine a number of sub-queries to generate. Mapping from hash values 113 to sub-queries 115 may be set dynamically based on a number of desired sub-queries.

At 440, method 400 proceeds by sending, by the computer system, ones of the plurality of sub-queries to a plurality of database repositories for the particular graph database. For example, sub-queries 115 may be mapped to respective ones of database repositories 150. The sub-queries 115 are sent to the respective database repositories 150 to be performed using the respective copies of graph database 155. Requested information associated with each vertex 112 included in each sub-query 115 may be gathered and returned to computer system 101. Computer system 101 may then analyze the returned information using parameters included in query 110 to produce a graph representation that indicates edges associated with vertices 112. This graph representation may then be provide to a user who sent query 110.

It is noted, that by dividing the query into a plurality of sub-queries, loads generated from processing queries may be balanced across a plurality of database repositories. Such load balancing may distribute workloads across the database repositories in a manner that reduces peak traffic to any given one repository. Using the plurality of sub-queries may also reduce an amount of time to produce a result to a query, thereby satisfying an established QoS that may be in place for particular users.

It is noted that the method of FIG. 4 includes elements 410-440. Method 400 may end in block 440 or may repeat some or all blocks of the method. For example, method 400 may return to block 410 to receive a subsequent query. In some embodiments, blocks 420 and 430 may be repeated to generate a satisfactory number of sub-queries. For example, a first hash operation may be used that does not adequately distribute the vertices among the sub-queries. Block 420 may be repeated using a different seed value for the hash operation or using a different hash operation to generated a new set of hash values. Multiple instances of method 400 may be performed concurrently in graph data server 100 to perform different queries. For example, computer system 101 may execute a plurality of processes for receiving a plurality of queries from one or more users.

Figure 5:
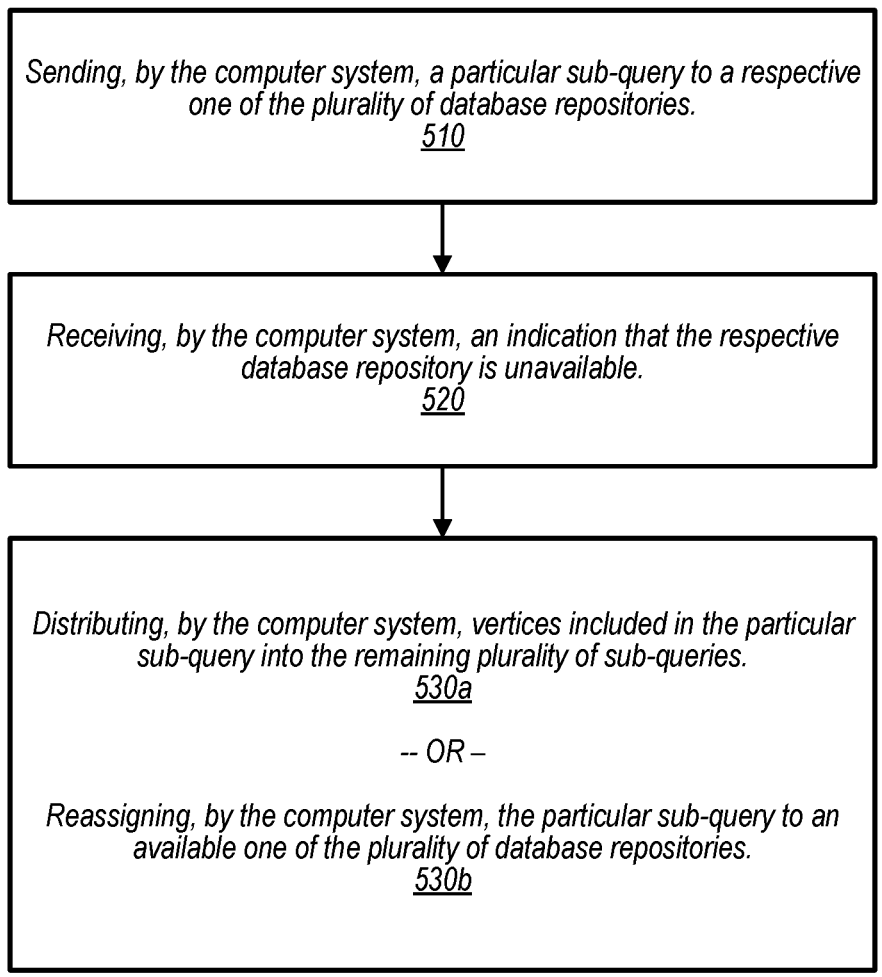
FIG. 5 shows a flow diagram of an embodiment of a method for handling an unavailable database repository.

Proceeding now to FIG. 5, a flow diagram of a method for managing an unavailable database repository is illustrated. In a similar manner as method 400, method 500 may be performed by a computer system such as computer system in graph data server 100 in FIG. 1. The computer system may, for example, include (or have access to) a non-transient, computer-readable medium having program instructions stored thereon that are executable by the computer system to cause the operations described with reference to FIG. 5. In some embodiments, some or all operations of method 500 may correspond to actions that occur as a part of block 440 in method 400. Method 500 is described below using graph data server 200 of FIG. 2 as an example. References to elements in FIG. 2 are included as non-limiting examples.

Method 500 begins at 510 by sending, by the computer system, a particular sub-query to a respective one of the plurality of database repositories. For example, query 210 in FIG. 2 is divided into sub-queries 215. A particular sub-query, e.g., sub-query 215b, is sent to redundant database repository 251a.

At 520, method 500 continues by receiving, by the computer system, an indication that the particular one of the plurality of database repositories is unavailable. As shown in the example of FIG. 2, redundant database repository 251a is unavailable. In some embodiments, the unavailability may be due to all or a portion of redundant database repository 251a being down for maintenance or hardware or software issues. In other embodiments, redundant database repository 251a may be functioning properly but may have reached a threshold level of bandwidth, resulting in redundant database repository 251a being unable to receive an additional workload. The indication may include a message from a computer system associated with redundant database repository 251a alerting graph data server of the unavailability. In other embodiments, the indication may be in the form of a lack of a reply (e.g., an acknowledgement) from redundant database repository 251a in response to sending sub-query 215b.

In various embodiments, method 500 may proceed using one of a plurality of techniques. In some embodiments, method 500 continues at 530a by distributing, by the computer system, vertices included in the particular sub-query intended for the unavailable database repository into the remaining plurality of sub-queries. As shown in EX. 1 of FIG. 2, portions of sub-query 215b may be distributed to one or more other sub-queries. A portion of sub-query 215b associated with vertex 212b is added to sub-query 215a, while a different portion of sub-query 215*b* associated with vertex 212*d* is added to sub-query 215*c*. Sub-queries 215*a* and 215*c* may be resent to primary database repository 250 and redundant database repository 251*b*, respectively, after the corresponding portions of sub-query 215*b* have been added. In other embodiments, the additional portions may be sent to primary database repository 250 and redundant database repository 251*b* after the original sub-queries 215*a* and 215*c* have been sent.

In other embodiments, method 500 continues at 530*b* by reassigning, by the computer system, the particular sub-query intended for the unavailable database repository to an available one of the plurality of database repositories. For example, as depicted in EX. 2 of FIG. 2, sub-query 215*b* main remain intact as a single sub-query and sent to one of the remaining available repositories, such as redundant database repository 251*b*. The available database repository may be selected using any suitable technique, such as a round robin selection, a random (or pseudo-random) selection, or based on a current bandwidth level.

It is noted that method 500 includes elements 510-530*b*. Method 500 may end in one of blocks 530*a* or 530*b* or may repeat some or all blocks of the method. For example, method 500 may return to block 520 if one of the other database repositories is also unavailable. Like method 400, method 500 may be performed concurrently with other instantiations of the method. For example, different queries may be processed concurrently such that more than one sub-query is sent to a same unavailable database repository.

Figure 6:
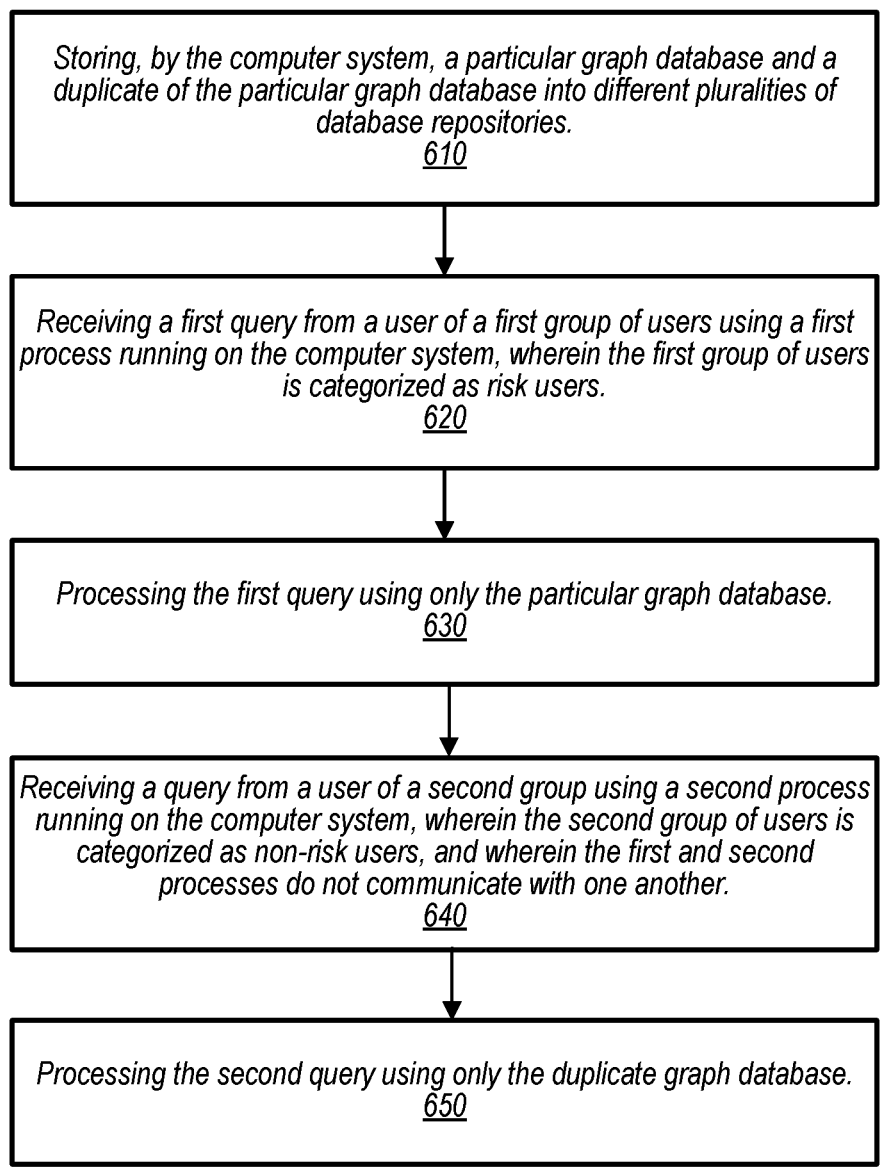
FIG. 6 depicts a flow diagram of an embodiment of a method for processing queries from two different groups of users.

Proceeding now to FIG. 6, a flow diagram of a method for maintaining a graph data server is illustrated. In a similar manner as methods 400 and 500, method 600 may be performed by one or more computer systems in a graph data server such as graph data server 300 in FIG. 3. Such computer systems may, for example, include (or have access to) a non-transient, computer-readable medium having program instructions stored thereon that are executable by the computer system to cause the operations described with reference to FIG. 6. Method 600 is described below using graph data server 300 of FIG. 3 as an example. References to elements in FIG. 3 are included as non-limiting examples.

Method 600 begins at 610 by storing, by the computer system, a particular graph database and a duplicate of the particular graph database into different pluralities of database repositories. For example, graph data server 300 includes risk-group repository 350 and non-risk-group repository 360. Respective copies of graph database 355 are stored in each of these repositories. Risk-group repository 350 is accessible by a first group of users categorized as risk (risk users 370), while non-risk-group repository 360 is accessible by a second group of users categorized as non-risk (non-risk users 375). One or more policies of an entity that owns and/or manages graph data server 300 may require a separation between risk users 370 and non-risk users 375. Accordingly, non-risk-group repository 360 is not accessible by risk users 370. In addition, links between the copies of graph database 355 in risk-group repository 350 and non-risk-group repository 360 may be prevented by such policies.

As disclosed above, risk users 370 may include users that have been associated with questionable activities, such as potential fraudulent behavior, activities associated with a filed complaint or claim, and/or activities linked to unauthorized access of a computer system. In such cases, the activity may not be sufficient to ban the user or terminate their subscription. In some cases, users associated with other users that are involved in such questionable behavior may be included in the risk users 370. New subscribers that do not have a history that can be tracked by graph data server 300 may also be included in risk users 370. Users, however, that are not associated with questionable activities and/or are associated with trusted entities may be placed in non-risk users 375.

Method 600 continues at 620 by receiving a first query from a user of a first group using a first process running on the computer system, wherein the first group of users categorized as risk. In the example of FIG. 3, the first query is received, from a first user of risk users 370, by server process 304 running on a computer system of graph data server 300. This first query may identify one or more vertices included in graph database 355.

At 630, method 600 continues by processing the first query using only the particular graph database. As shown, for example, server process 304 utilizes only the copy of graph database 355 in risk-group repository 350. Risk-group repository 350 may include a plurality of database repositories, such as a primary repository and one or more duplicate repositories. Accordingly, the techniques described above in regards to FIGS. 1 and 2, as well as methods 400 and 500, may be utilized by server process 304 to perform the first query using only risk-group repository 350.

Method 600 proceeds at 640 by receiving a second query from a user of a second group using a second process running on the computer system, wherein the second group of users is categorized as non-risk, and wherein the first and second processes do not communicate with one another. For example, the second query is received, from a second user of non-risk users 375, by server process 308 running on a computer system of graph data server 300. Like the first query, the second query may also identify one or more vertices included in graph database 355. In accordance to policies associated with graph data server 300, server process 304 and server process 308 do not communicate with one another. This separation of processes between risk users 370 and non-risk users 375 may reduce a risk of an ill-intentioned user of risk users 370 being able to obfuscate and/or corrupt information used to perform the second query. Such corruption or obfuscation could potentially enable the ill-intentioned user to prevent the second user from accessing accurate information with the second query which, for example, could lead to the second user being susceptible to fraudulent activity.

At 650, method 600 continues by processing the second query using only the duplicate graph database. In FIG. 3, for example, server process 308 utilizes only the copy of graph database 355 in non-risk-group repository 360. Like risk-group repository 350, non-risk-group repository 360 may also include a plurality of database repositories, including a primary repository and one or more duplicate repositories. Again, techniques disclosed herein may be utilized by server process 308 to perform the second query using only non-risk-group repository 360.

It is noted that method 600 includes elements 610-650. Method 600 may end in block 650 or may repeat some or all blocks of the method. For example, method 600 may return to block 620 and/or 640 to receive additional queries from users of the risk and non-risk groups, respectively. Like method 400, method 600 may be performed concurrently with other instantiations of the method. In addition, blocks within method 600 may be performed in a different order, including e.g., concurrently. For example, blocks 620 and 630 may be performed in an overlapping manner with blocks 640 and 650.

Figure 7:
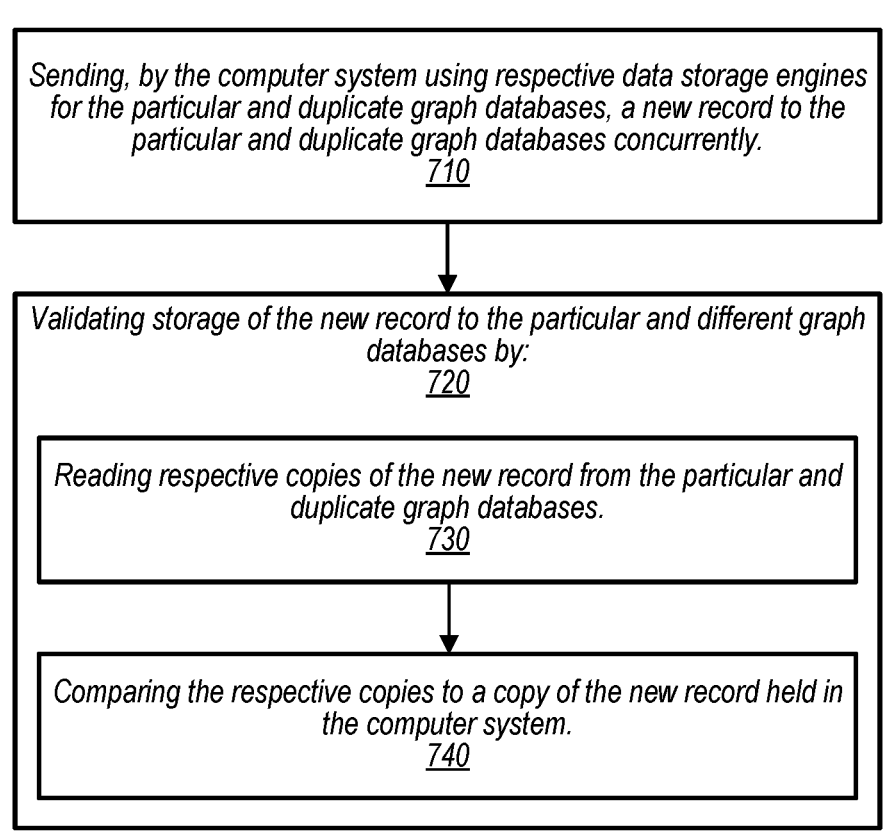
FIG. 7 illustrates a flow diagram of an embodiment of a method for storing and validating a new record to respective copies of a graph database.

Moving to FIG. 7, a flow diagram of a method for adding a new record to respective copies of a graph database is shown. Method 700 may be performed, in a similar manner as previously disclosed methods, by a computer system in a graph data server such as graph data server 300 in FIG. 3. In some embodiments, method 700 may correspond to actions that occur as a part of block 610 in method 600. Graph data server 300 of FIG. 3 is used in the following paragraphs as an example for performing method 700. References to elements in FIG. 3 are included as non-limiting examples.

Method 700 begins at block 710 by sending, by the computer system using respective data storage engines for the particular and duplicate graph databases, a new record to the particular and duplicate graph databases concurrently. As shown in FIG. 3, graph data process server 320 uses data storage engine 325a to store a copy of new record 340 to risk-group repository 350, and uses the independent data storage engine 325b to store another copy of new record 340 into non-risk-group repository 360. Graph data process server 320, as disclosed herein, is a process running in graph data server 300 for maintaining graph database 355 in both risk-group repository 350 and non-risk-group repository 360. Maintenance of graph database 355 includes observing system activity 390 using data process engine 380 and, based on system activity 390, generating new records for storage in both copies of graph database 355. In order to reduce chances of the two copies of graph database 355 from having any differences at a given point in time, graph data process server 320 uses the independent data storage engines 325a and 325b to store new record 340 into both risk-group repository 350 and non-risk-group repository 360 concurrently. Due to various conditions (e.g., current workloads, hardware availability, and the like), storage of new record 340 to each of graph databases 355 may not begin and/or end at exactly the same points in time. The concurrent use of data storage engines 325a and 325b, however, may reduce an amount of time during which new record 340 is available for queries in one repository versus the other repository.

At 720, method 700 continues by validating storage of the new record to the particular and different graph databases. After operations of block 710 complete, for example, data verification engine 330 validates that new record 340 has been successfully stored to both risk-group repository 350 and non-risk-group repository 360. As shown, the validation includes the following two sub-blocks.

Block 720 includes sub-block 730 in which method 700 proceeds by reading respective copies of the new record from the particular and duplicate graph databases. As illustrated, data verification engine 330 reads the newly stored copies of new record 340 from each copy of graph database 355. As indicated in FIG. 3, no communication is permitted between risk-group repository 350 and non-risk-group repository 360. Accordingly, separate read requests are issued by data verification engine 330 to each repository.

Block 720 further includes sub-block 740 in which method 700 continues by comparing the respective copies to a copy of the new record held in the computer system. Data verification engine 330, for example, receives a copy of new record 340 that is provided by data process engine 380. Data verification engine 330 compares this original copy to copies received from each of risk-group repository 350 and non-risk-group repository 360. If a copy of new record 340 from either of risk-group repository 350 and non-risk-group repository 360 does not match the copy of new record 340 from data process engine 380, then the appropriate one of data store engines 325 is used to resend the storage request to correct the unsuccessfully stored copy of new record 340.

It is noted that method 700 includes elements 710-740. Method 700 may end in sub-block 740 or may repeat some or all blocks of the method. Some or all blocks of method 700 may, for example, be repeated in response to a failure to successfully verify the stored copies of new record 340. It is contemplated that some or all of methods 400, 500, 600, and 700 (or portions thereof) may be performed concurrently in an embodiment of a graph data server. In other embodiments, portions of a given one of the disclosed methods may be included with other ones of the methods.

Figure 8:
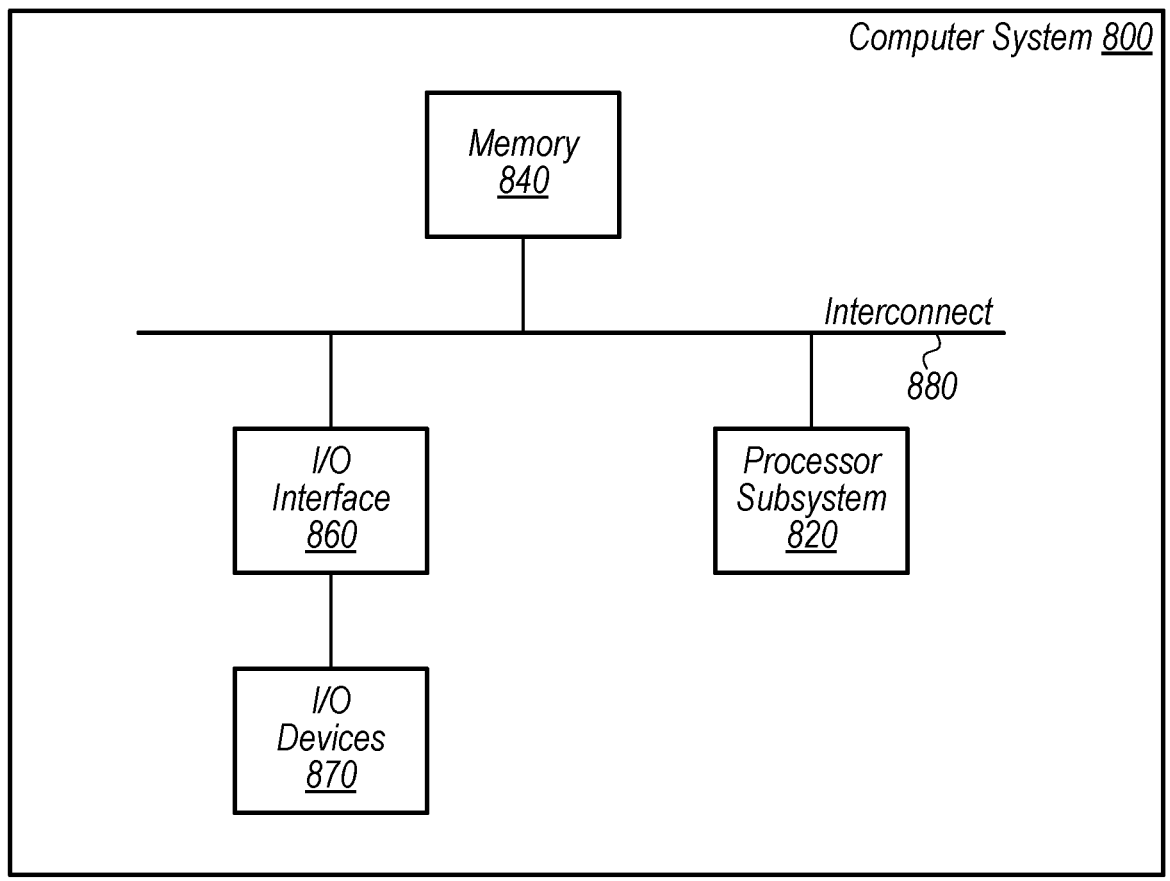
FIG. 8 depicts a block diagram of an embodiment of a computer system that may be used to implement one or more embodiments of the disclosed system.

In the descriptions of FIGS. 1-7, various computer systems for implementing the disclosed techniques have been disclosed, such as computer system 101 in FIG. 1. In addition, server processes 304 and 308, graph data process server 320, and any of the disclosed repositories (150, 250, 251, 350, and 360) may be implemented using one or more computer systems. These computer systems may be implemented in a variety of manners. FIG. 8 provides an example of a computer system that may correspond to one or more of the disclosed systems.

Referring now to FIG. 8, a block diagram of an example computer system 800 is depicted. Computer system 800 may, in various embodiments, implement one or more of the disclosed computer systems, such as computer system 101 and/or any disclosed repository. Computer system 800 includes a processor subsystem 820 that is coupled to a system memory 840 and I/O interfaces(s) 860 via an interconnect 880 (e.g., a system bus). I/O interface(s) 860 is coupled to one or more I/O devices 870. Computer system 800 may be any of various types of devices, including, but not limited to, a server computer system, personal computer system, desktop computer, laptop or notebook computer, mainframe computer system, server computer system operating in a datacenter facility, tablet computer, handheld computer, smartphone, workstation, network computer, connected vehicle, etc. Although a single computer system 800 is shown in FIG. 8 for convenience, computer system 800 may also be implemented as two or more computer systems operating together, e.g., as a virtual computer system.

Processor subsystem 820 may include one or more processor circuits. In various embodiments of computer system 800, multiple instances of processor subsystem 820 may be coupled to interconnect 880. In various embodiments, processor subsystem 820 (or each processor unit within 820) may contain a cache or other form of on-board memory.

System memory 840 is usable to store program instructions executable by processor subsystem 820 to cause computer system 800 perform various operations described herein, including, for example, any of methods 400-700. System memory 840 may be implemented using any suitable type of memory circuits including, for example, different physical, non-transient, computer-readable media, such as hard disk storage, floppy disk storage, removable disk storage, flash memory, random access memory (RAM—SRAM, EDO RAM, SDRAM, DDR SDRAM, LPDDR SDRAM, etc.), read-only memory (PROM, EEPROM, etc.), and so on. Memory circuits in computer system 800 are not limited to primary storage such as system memory 840. Rather, computer system 800 may also include other forms of storage such as cache memory in processor subsystem 820 and secondary storage in I/O devices 870 (e.g., a hard drive, storage array, etc.). In some embodiments, these other forms of storage may also store program instructions executable by processor subsystem 820.

I/O interfaces 860 may be any of various types of interfaces configured to couple to and communicate with other devices, according to various embodiments. In one embodiment, I/O interface 860 is a bridge chip (e.g., Southbridge) from a front-side to one or more back-side buses. I/O interfaces 860 may be coupled to one or more I/O devices 870 via one or more corresponding buses or other interfaces. Examples of I/O devices 870 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 870 includes a network interface device (e.g., configured to communicate over Wi-Fi®, Bluetooth®, Ethernet, etc.), and computer system 800 is coupled to a network via the network interface device.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

In this disclosure, various "processes" and "engines" are operable to perform designated functions are shown in the figures and described in detail (e.g., server processes 304 and 308, data storage engines 325a and 325b, data verification engine 330, etc.). As used herein, "processes" and "engines" refer to software and/or hardware operable to perform a specified set of operations. A process/engine may refer to a set of software instructions that are executable by a computer system to perform the set of operations. A process/engine may also refer to hardware that is configured to perform the set of operations. A hardware engine may, for example, constitute general-purpose hardware as well as a non-transitory computer-readable medium that stores program instructions, or specialized hardware such as a customized ASIC. Accordingly, a process/engine that is described as being "executable" to perform operations refers to a software module, while a process/engine that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa.

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method comprising:
    maintaining a primary copy of a particular graph database on a first repository of a plurality of database repositories;
    maintaining one or more redundant copies of the particular graph database on respective one or more different repositories of the plurality of database repositories;
    receiving, by a computer system, a query to retrieve information from the particular graph database, the query identifying a plurality of vertices of the particular graph database;
    performing, by the computer system, hash operations on two or more of the plurality of vertices to generate respective hash values;
    dividing, by the computer system using the respective hash values, the query into a plurality of sub-queries, each corresponding to a subset of the plurality of vertices; and
    sending, by the computer system, ones of the plurality of sub-queries to respective ones of the plurality of database repositories to retrieve corresponding portions of the information from a plurality of copies of the particular graph database.

2. The method of claim 1, further comprising:
    receiving, by the computer system from the respective ones of the plurality of database repositories, corresponding results for the ones of the plurality of sub-queries; and
    based on the received results, sending a response to the query.

3. The method of claim 1, further comprising:
receiving, by the computer system, an indication that a particular one of the plurality of database repositories is unavailable; and
distributing, by the computer system, vertices included in a sub-query intended for the unavailable database repository into remaining ones of the plurality of sub-queries.

4. The method of claim 1, further comprising:
receiving, by the computer system, an indication that a particular one of the plurality of database repositories is unavailable; and
reassigning, by the computer system, a sub-query intended for the unavailable database repository to an available one of the plurality of database repositories.

5. The method of claim 1, further comprising:
storing, by the computer system, a duplicate of the particular graph database into a different plurality of database repositories;
wherein the particular graph database is accessible by a first group of users categorized as risk; and
wherein the duplicate graph database is accessible by a second group of users categorized as non-risk and is not accessible by the first group.

6. The method of claim 5, further comprising:
receiving a first query from a user of the first group using a first process running on the computer system; and
receiving a second query from a user of the second group using a second process running on the computer system, wherein the first and second processes do not communicate with one another.

7. The method of claim 5, wherein storing the particular and duplicate graph databases includes sending, by the computer system using respective data storage engines for the particular and duplicate graph databases, a new record to the particular and duplicate graph databases concurrently.

8. The method of claim 7, further comprising validating storage of the new record to the particular and duplicate graph databases by:
reading respective copies of the new record from the particular and duplicate graph databases; and
comparing the respective copies to a copy of the new record held in the computer system.

9. A computer-readable, non-transient memory including instructions that when executed by a computer system within a computer network, cause the computer system to perform operations including:
maintaining a primary copy of a particular graph database in a first database repository of a plurality of database repositories;
maintaining one or more redundant copies of the particular graph database on respective one or more different database repositories of the plurality of database repositories;
receiving a query to retrieve information from the particular graph database, the query identifying a plurality of vertices of the particular graph database;
generating respective hash values for two or more of the plurality of vertices;
dividing, using the respective hash values, the query into a plurality of sub-queries, ones of the sub-queries corresponding to a subset of the plurality of vertices; and
sending ones of the plurality of sub-queries to respective repositories of the plurality of database repositories to retrieve corresponding portions of the information from the redundant copies of the particular graph database.

10. The computer-readable, non-transient memory of claim 9, wherein generating the respective hash values includes performing hash operations on user identification information associated with ones of the subset of vertices.

11. The computer-readable, non-transient memory of claim 9, further comprising, in response to an indication that a particular one of the plurality of database repositories is unavailable, distributing vertices included in a sub-query intended for the unavailable database repository into remaining ones of the plurality of sub-queries.

12. The computer-readable, non-transient memory of claim 9, further comprising, in response to an indication that a particular one of the plurality of database repositories is unavailable, reassigning a sub-query intended for the unavailable database repository to an available one of the plurality of database repositories.

13. The computer-readable, non-transient memory of claim 9, further comprising:
storing a duplicate of the particular graph database into a different plurality of database repositories;
wherein the particular graph database is accessible by a first group of users; and
wherein the duplicate graph database is accessible by a second group of users and is not accessible by the first group.

14. The computer-readable, non-transient memory of claim 13, further comprising:
receiving a first query from a user of the first group using a first process running on the computer system; and
receiving a second query from a user of the second group using a second process running on the computer system, wherein the first and second processes are isolated from one another.

15. The computer-readable, non-transient memory of claim 13, wherein storing the particular and duplicate graph databases includes sending, using respective data storage engines for the particular and duplicate graph databases, a new record to the particular and duplicate graph databases concurrently.

16. A system comprising:
a processor circuit; and
a memory circuit including instructions that when executed by the processor circuit, cause the system to perform operations including:
maintaining a primary copy of a particular graph database on a first repository of a plurality of database repositories;
maintaining one or more redundant copies of the particular graph database on a respective one or more different repositories of the plurality of database repositories;
receiving a query to retrieve information from the particular graph database, the query identifying a plurality of vertices of the particular graph database;
generating respective hash values for two or more of the plurality of vertices;
dividing, using the respective hash values, the query into a plurality of sub-queries, ones of the sub-queries corresponding to a subset of the plurality of vertices; and
sending ones of the plurality of sub-queries to respective repositories of the plurality of database repositories to retrieve corresponding portions of the information from the redundant copies of the particular graph database.

17. The system of claim 16, wherein the operations further include:

receiving, based on the ones of the plurality of sub-queries, the corresponding portions of the information from the redundant copies of the particular graph database; and based on the received portions of the information, sending a response to the query.

18. The system of claim 16, wherein generating the respective hash values includes performing hash operations on information about electronic exchanges associated with ones of the subset of vertices.

19. The system of claim 16, wherein the operations further include:

receiving an indication that a particular one of the plurality of database repositories is unavailable; and distributing vertices included in a sub-query intended for the unavailable database repository into remaining ones of the plurality of sub-queries.

20. The system of claim 16, wherein the operations further include:

storing a duplicate of the particular graph database into a different plurality of database repositories;

wherein the particular graph database is accessible by a first group of users; and wherein the duplicate graph database is accessible by a second group of users and is not accessible by the first group.

\* \* \* \* \*